Oct. 21, 1924.  1,512,289
D. H. McCORKLE
ELECTRIC HEATER
Filed Dec. 10, 1923
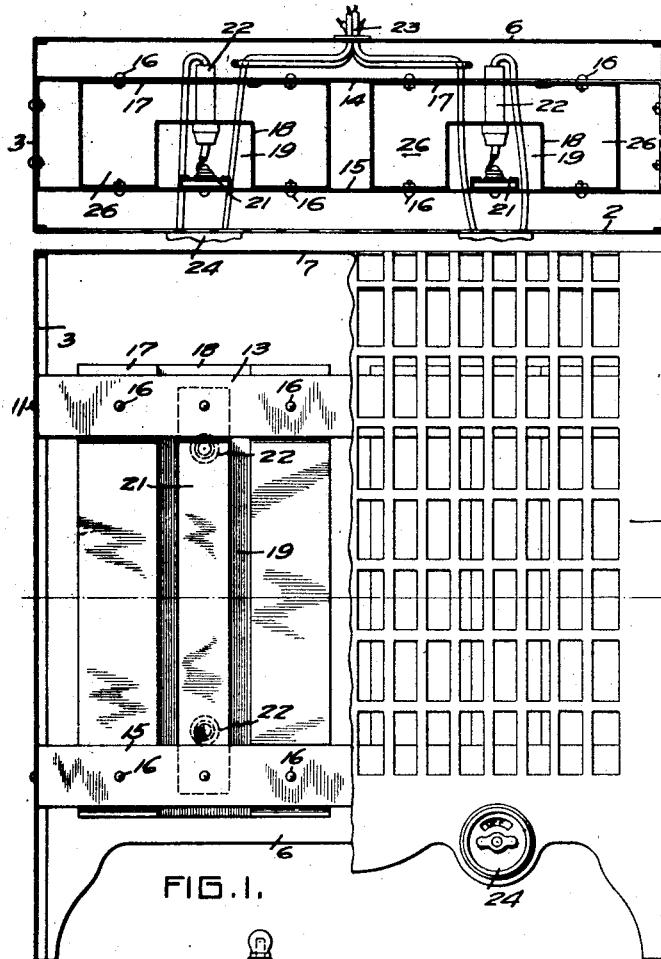
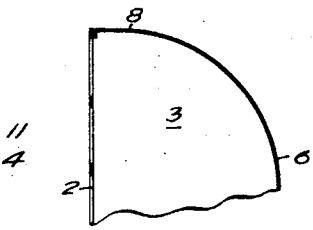
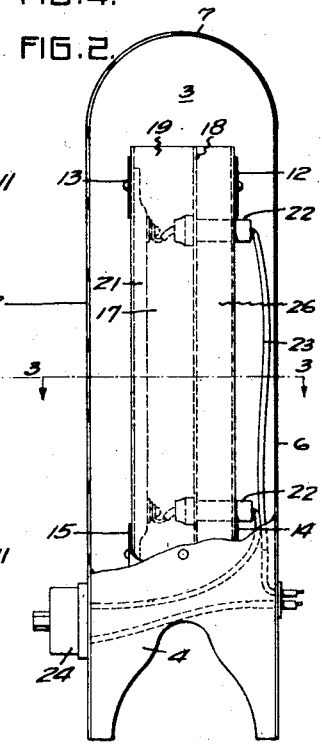
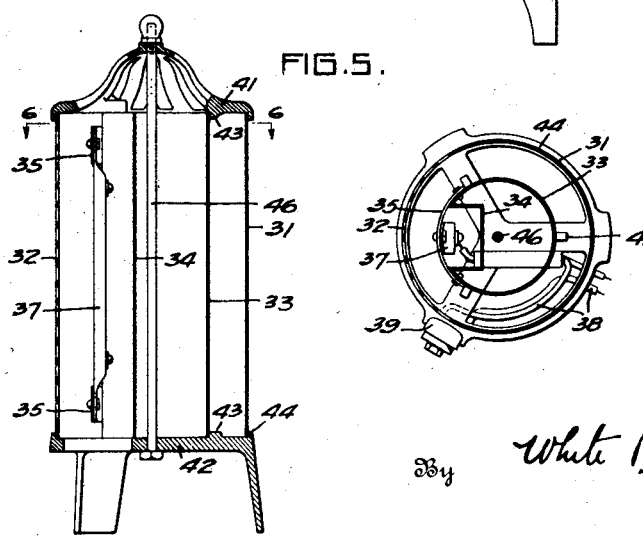
Inventor
Donald H. McCorkle
By White Prost + Evans
his Attorney Patented Oct. 21, 1924.

1,512,289

UNITED STATES PATENT OFFICE.

DONALD H. McCORKLE, OF BERKELEY, CALIFORNIA.

ELECTRIC HEATER.

Application filed December 10, 1923. Serial No. 679,628.

*To all whom it may concern:*

Be it known that I, DONALD H. MCCORKLE, a citizen of the United States, and a resident of Berkeley, county of Alameda, State of California, have invented a certain new and useful Electric Heater, of which the following is a specification.

My invention relates to electric room heaters of the portable or fireplace type, and one of the objects of the invention is the provision of an electric heater in which substantially one-half of the heat generated by the heating element is thrown directly into the air from the incandescent and visible surface of the heating element, while the remaining heat from the heating element is absorbed by a partially surrounding wall, and conducted by convection to radiating surfaces from which it passes to the air, inducing a circulation thereof past the radiating surfaces.

Another object of the invention is to provide a heater unit comprising a tube having a reentrant portion in which the electric heating element is disposed.

Another object of the invention is the provision of an electric heater of the character described comprising the advantages of a visible incandescent heating element, and heat radiating surfaces which force a circulation of the air of the room in which the heater is placed.

My invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:—

Figure 1 is a front elevation of a two-unit heater embodying my invention. A portion of the front wall is omitted, better to disclose the internal structure of the heater.

Figure 2 is a side elevation of the heater shown in Figure 1, a portion of the side wall being broken away to disclose the heating unit.

Figure 3 is a horizontal sectional view of my heater, the plane of section being indicated by the line 3—3 of Figure 2.

Figure 4 is a side elevation of the upper portion of my heater as adapted for a fireplace. The remainder of the fireplace heater is the same as that shown in Figure 2.

Figure 5 is an elevation of another embodiment of my invention, and having but a single heating unit.

Figure 6 is a vertical section of the heater shown in Figure 5, the plane of section being indicated by the line 6—6 of Figure 5.

In terms of broad inclusion my electric heater comprises a housing, the front wall of which is formed as a grill, and within which is supported one or more heating units which are spaced from the walls of the housing and from each other, where two or more are used. Each heating unit comprises a tube having a reentrant portion in which the heating element, which is preferably in strip form, is disposed. Suitable switch controlled electrical connections are provided so that the heater may be plugged in on any convenient supply line.

In detail, the heater of my invention comprises a housing which, as shown in Figure 1, may be of rectangular form with the front wall 2 formed as a grill of any desired design. The side walls 3 and 4 and the rear or back wall 6 are preferably solid or imperforate. In the portable type of heater shown in Figures 1 and 2, the front and rear walls meet in a curved top 7. part of which is a continuation of the grill as shown, or in any other suitable shape. In the fireplace type of heater, as shown in Figure 4, the rear wall 6 curves forwardly in the top 8 to meet the front wall 2 so as to direct the currents of air forwardly into the room. The lower portion of the housing within the walls is left as unobstructed as possible to permit the free entrance of air. Extending between the ends or sides 3 and 4 and fastened thereto by any suitable means such as the bolts 11, are bars 12 and 13 in the upper portion of the housing and bars 14 and 15 in the lower portion of the housing. The bars are preferably parallel and spaced from the front and rear walls of the housing as shown, and the bars 12 and 13 are vertically alined respectively with the bars 14 and 15.

Spaced from each other and from the sides of the housing and secured to the bars 12, 13, 14 and 15 by suitable means such as the bolts 16, are tubes 17 of generally rectangular section, as shown in Figure 3, and formed with a reentrant portion 18, across the upper portion of which the bar 13 passes, and across the lower portion of which the bar 15 passes. Arranged within the recess 19 enclosed by the reentrant portion of the tubes, and supported at the top and bottom by the bars 13 and 15, is a heating element 21, preferably a strip heating element of known structure. Porcelain tubes 22 disposed in the walls of the tube provide safe passage therethrough for the conductors 23 which connect the strip heating element with a suitable source of energy. A switch 24 which preferably is placed on the lower front portion of the housing and is interposed in the circuit in the usual way, provides means for controlling the operation of each unit.

Since both ends of the tubes 17 are open and the reentrant portion extends longitudinally the full length of the tube, there are provided a plurality of passages or flues for air, from the room in which the heater is placed, to pass upwardly through the heater in contact with the heated surfaces. One such column of air passes upwardly through the recess 19 formed by the reentrant portion of each tube. Another stream passes upwardly through the passage 26 enclosed within the tube, and still other streams pass upwardly along the outer walls of the tubes.

When the electric heating element is energized, a portion preferably about one-half of the heat generated thereby, is radiated forwardly directly into the atmosphere through the grill, the front portion of the heating element becoming incandescent so that my heater has the advantage of a visibly incandescent element which makes a strong appeal to most users of such a device. The walls 18 of the reentrant portion of the tube also absorb heat from the heating element, and by convection this heat is carried around through the walls of the tube so that even the rear wall, farthest removed from the heating element, becomes hot and capable of imparting heat to the ascending currents of air passing through the tubes and housing. Because of these radiating surfaces and the tubular construction, a draft of air is induced through the heater. My device thus also embodies the advantage of circulating the air in the room so that the entire room is evenly heated.

In Figures 5 and 6, I have shown a single unit in which the housing comprises a cylindrical shell 31, a portion 32 of which, is formed as a grill. Within the housing is a tube 33 having the reentrant portion 34 bridged at the top and bottom by bars 35, to which are attached the strip heating elements 37, energized by the conductors 38 and controlled by the conveniently placed switch 39. Means are provided for holding the housing and tubes in proper relation, by a top 41 and base 42 of any pleasing design, each provided with spacing lugs 43 for the tubes and a flange 44 for the housing 41. Both the top and bottom are formed with apertures to permit as free a passage of air through the housing and tubes as possible, and a long bolt 46 connecting the top and base, holds them upon the tubes and housing as shown.

I claim:

1. In an electric heater, a tube having a reentrant portion, and an electric heating element arranged within the reentrant portion.

2. In an electric heater, a tube having a reentrant portion, an electric heating element arranged within the reentrant portion, and a housing spaced from and surrounding the tube.

3. In an electric heater, a tube having a reentrant portion, an electric heating element arranged within the reentrant portion, and a housing spaced from and surrounding the tube and having one side formed as a grill.

4. In an electric heater, a tube open at both ends and having a reentrant portion extending longitudinally thereof, and an electric heating element arranged within the reentrant portion.

5. In an electric heater, a tube open at both ends and having a reentrant portion extending longitudinally thereof, an electric heating element arranged within the reentrant portion, and a housing open at the bottom and with one side formed as a grill spaced from and surrounding the tube.

6. An electric heater comprising a housing, bars supported on opposite sides of the housing, a plurality of tubes spaced from each other and from the sides of the housing and supported on said bars, each tube having a reentrant portion, and an electric heating element arranged in the reentrant portion of each tube.

7. An electric heater comprising a housing, bars supported on opposite sides of the housing, a plurality of tubes spaced from each other and from the sides of the housing and supported on said bars, each tube having a reentrant portion, and an electric heating element supported on certain of said bars and within the reentrant portion of each tube.

8. An electric heater comprising an open bottom housing, the front of which is formed as a grill, a pair of bars supported on the sides of the housing, in the upper and lower portion thereof and spaced from the grill and back thereof, a plurality of tubes spaced from each other and from the sides of the housing and supported between said bars, each tube having a reentrant portion, and an electric heating element supported on the bars adjacent the grill and within the reentrant portion of each tube.

In testimony whereof, I have hereunto set my hand.

DONALD H. McCORKLE.